United States Patent
Stehling et al.

(10) Patent No.: US 7,322,563 B2
(45) Date of Patent: Jan. 29, 2008

(54) ARRANGEMENT FOR SECURING IN-GROUND WATER VALVES

(75) Inventors: Fred J. Stehling, Lodi, WI (US); Terry R. McWilliams, DeSoto, TX (US); Roy Istre, Jr., Corsicana, TX (US)

(73) Assignee: Custodian Patent, LLC, Irving, TX (US)

( * ) Notice: Subject to any disclaimer, the term of this patent is extended or adjusted under 35 U.S.C. 154(b) by 0 days.

(21) Appl. No.: 11/101,650

(22) Filed: Apr. 8, 2005

(65) Prior Publication Data

US 2006/0225789 A1    Oct. 12, 2006

(51) Int. Cl.
*F16K 31/02* (2006.01)

(52) U.S. Cl. ................ 251/292; 137/371; 137/382.5

(58) Field of Classification Search ............... 251/291, 251/292, 293; 137/368, 371, 377, 382, 382.5
See application file for complete search history.

(56) References Cited

U.S. PATENT DOCUMENTS

| | | | | |
|---|---|---|---|---|
| 3,222,976 | A | * | 12/1965 | Holman ....................... 411/337 |
| 3,626,961 | A | * | 12/1971 | Quinones ..................... 137/296 |
| 3,831,802 | A | * | 8/1974 | Chambers et al. ........... 220/300 |
| 4,033,372 | A | * | 7/1977 | Bowman ...................... 137/296 |
| 4,715,252 | A | * | 12/1987 | Pella ........................... 81/176.1 |
| 4,836,065 | A | * | 6/1989 | Setliff ......................... 81/124.2 |
| 4,936,336 | A | * | 6/1990 | McCauley et al. ........... 137/296 |
| 5,871,030 | A | * | 2/1999 | Agbay ......................... 137/364 |
| 5,908,214 | A | * | 6/1999 | Dinardo ...................... 294/19.2 |
| 5,988,209 | A | * | 11/1999 | Hardy ......................... 137/382 |
| 6,131,604 | A | * | 10/2000 | Harriss ....................... 137/382.5 |

* cited by examiner

*Primary Examiner*—Gregory Huson
*Assistant Examiner*—John K. Fristoe, Jr.
(74) *Attorney, Agent, or Firm*—Millen, White, Zelano & Branigan, P.C.

(57) ABSTRACT

Underground water valves having square operating nuts, such as but not limited to critical water valves which control different pressure zones or different demand areas, are secured by a shielding cap, each of which have a recess that receives a valve operating nut and a cylindrical projection which frustrates attempts to rotate the operating nut. When an authorized person decides to open or close one of the valves, the shielding cap is retrieved from the operating nut by a retrieving head which has the socket defined by a frustoconical recess. Within the recess are a pair of opposed pins which seat in J-shaped slots in the frustoconical projection. Upon rotating the retrieving head, the pins move into alignment with open ends of the J-shaped slots, down shank portions of the slots and abut closed ends of the slots so that the shielding cap may be pulled from the valve operating nut and withdrawn through the valve operating box. The operating nut is then exposed for rotation by a wrench having an elongated rod with a T-shaped handle and a socket which complements the valve operating nut in size and shape. After the operating nut has been rotated to open or close the valve, as desired, the shielding cap is returned to a nesting relationship with the operating nut.

19 Claims, 8 Drawing Sheets

ARRANGEMENT FOR SECURING IN-GROUND WATER VALVES

FIELD OF THE INVENTION

The present application is directed to an arrangement for securing in-ground water valves. More particularly, the present invention is related to an arrangement for securing in-ground water valves deemed "critical valves" because the valves control water distribution to locations having more than a single address.

BACKGROUND OF THE INVENTION

In a water distribution system, valves are located on all buried water lines ranging from 3 inches in diameter to 24 inches in diameter and are also located in water lines which are of even greater diameters. In most cases, such valves are buried 3 feet to 8 feet below the surface of the ground and are accessed by a valve box configured as a pipe which is 6 to 8 inches in diameter extending to the surface of the ground. This allows someone to operate the valves from above with a long T-handle wrench. The T-handle wrenches have a 2 inch square drive that fits 2 inch square operating nuts for the valves.

Municipal water systems utilize thousands of in-ground valves within a single system. Some of these valves are deemed "critical valves." These critical valves typically control different pressure zones in different demand areas which are generally portions of the water system which have numerous addresses and require different levels of service. In order for a water system to function properly, these valves are either in a closed or open position. If a person operates the wrong valve, there can be serious damage or water outages to areas within a city. Accordingly, it is very important that these valves not be operated by an unauthorized person. In order to avoid these difficulties, some municipalities or counties put signs on valve box pipes warning that the valves are critical valves and should not be tampered with. In order to further drive this point home, some municipalities install pieces of wood or plastic pipe in the valve access boxes to deter access to the valves. In spite of these precautions, users of city water, such as but not limited to contractors, on occasion decide to open or close valves which can result in water being denied to downstream customers or excessive water being delivered to downstream customers which can result in backups and unwanted disturbances to an entire water system. Consequently, there is a need to minimize the likelihood that a non-authorized person might tamper with critical in-ground valves.

SUMMARY OF THE INVENTION

In view of the aforementioned considerations, the present invention is directed to an arrangement for securing an in-ground water valve having a polygonal operating nut wherein the valve comprises a shielding member having a recess which fits over the polygonal operating nut and a retrieving head which couples with the shielding member for lifting the shielding member from the operating nut to expose the operating nut for operation by an authorized person.

In a further aspect of the security arrangement, a shielding member having a recess at a first end thereof fits over the polygonal operating nut. The shielding member has a conical projection projecting away from the recess toward a second end of the shield. A first coupling member is positioned on the shield. A retrieving head having a first end and a second end is used to remove the shield member from the operating nut, wherein the first end of the retrieving head has a handle extending therefrom and the second end has a socket for receiving the conical portion. A second coupling member, complementing the first coupling member, is positioned within the socket wherein upon moving the socket over the conical projection, and coupling the first and second coupling members, the shield is lifted to expose the operating nut of the valve for operation by an authorized person.

In a further aspect of the security arrangement, the conical projection has an exterior surface with the first coupling member associated therewith and the socket member has an interior conical surface with the second coupling member associated therewith.

In still a further aspect of the security arrangement, the first coupling member comprises at least one groove in the conical member and the second coupling member comprises at least one projection in the socket that cooperates with the groove to facilitate lifting the shielding member from the operating nut for the valve.

In still a further aspect of the security arrangement, the groove is J-shaped with an axially extending opened shank portion and a U-shaped portion extending laterally from the J-shaped portion and terminating with a closed end, whereby the at least one projection in the socket seats in the groove enabling one to lift the shielding member from the operating nut to expose the operating nut for operation by an authorized person.

In still a further aspect of the security arrangement, there are two J-shaped grooves.

In still a further aspect of the invention, the shielding member is made of aluminum.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
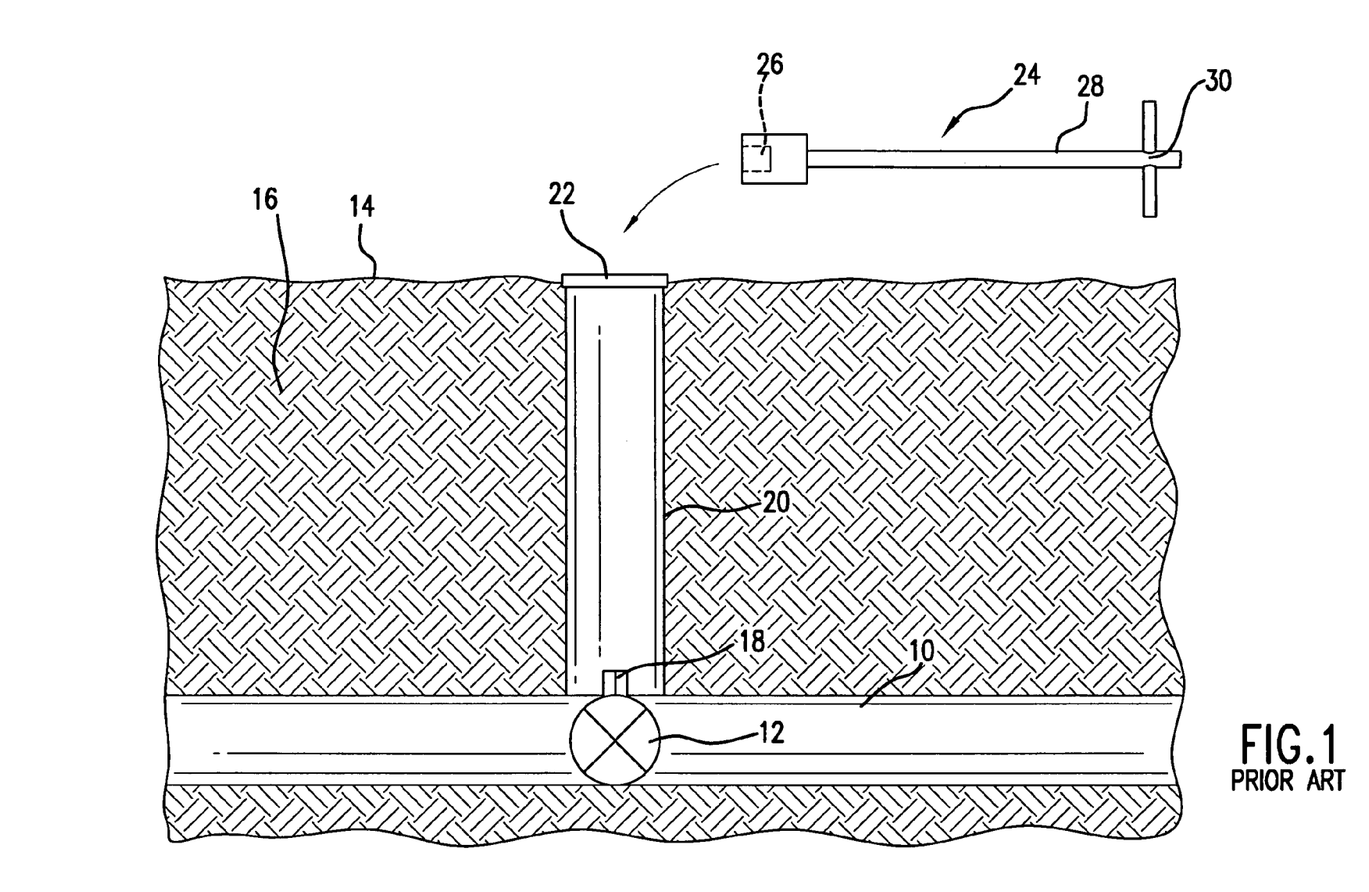
FIG. 1 is a side elevation showing an in-ground valve for opening and closing a water line in accordance with the prior art arrangements.

Referring now to FIG. 1 there is shown an in-ground water line 10 having an in-ground valve 12 therein that opens and closes to allow flow of water through the water line from one side of the valve to the other. The diameter of the water line 10 typically ranges from 3 inches to 24 inches, and even larger, and is buried below the surface of 14 of the ground 16 a distance of about 3 to about 8 feet. The valve 10 has a polygonal operating nut 18, which is in almost all underground valve installations is square. The operating nut 18 is accessed through a valve box in the form of a 6 to 8 inch diameter pipe 20 that is closed by a ground access cover 22. In order to open or close the valve 12, the ground access cover 22 is removed and a wrench 24 having a polygonal socket 26 at the end of a an elongated operating rod 28 with a T-handle 30 engages and rotates the operating nut 18.

As has been stated in the Background of the Invention, municipal water systems utilize thousands of valves 12 and some of these valves are deemed "critical valves." When the valves 12 are critical valves they control different pressure zones and different demand areas. In order for the municipal system to function properly, these valves are either in a closed, open or intermediate position. If a valve 12 is closed or opened inappropriately, there can be serious damage or water outages to certain areas within a water district. Accordingly, attempts are made to warn unauthorized operators of these critical valves by, for example, installing pieces of wood or plastic pipe in the valve box 20 to deter access to the valve 12.

Figure 2:
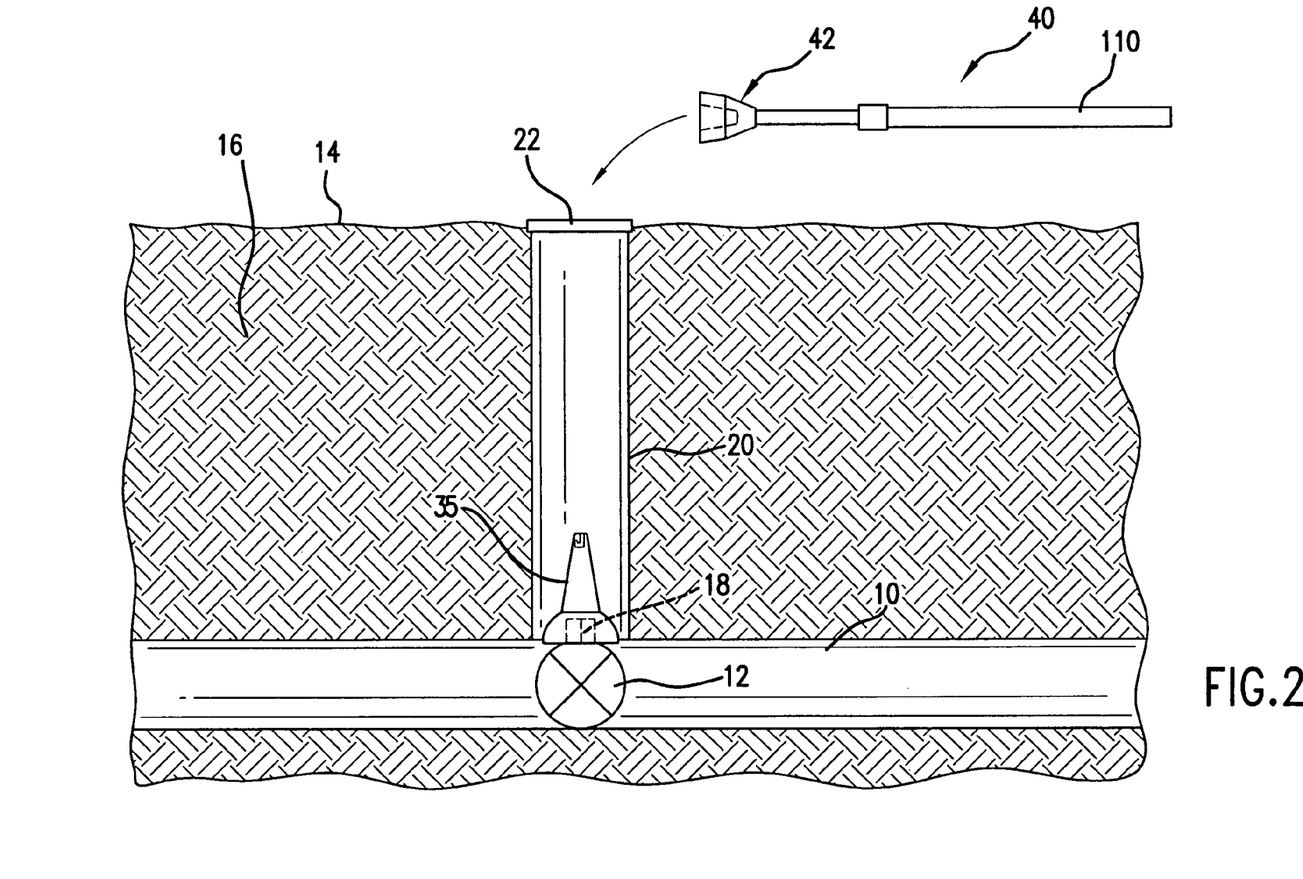
FIG. 2 is a view similar to FIG. 1 but including a valve shielding cap according to the present invention and a retrieving tool for removing the shielding cap.
Figure 3:
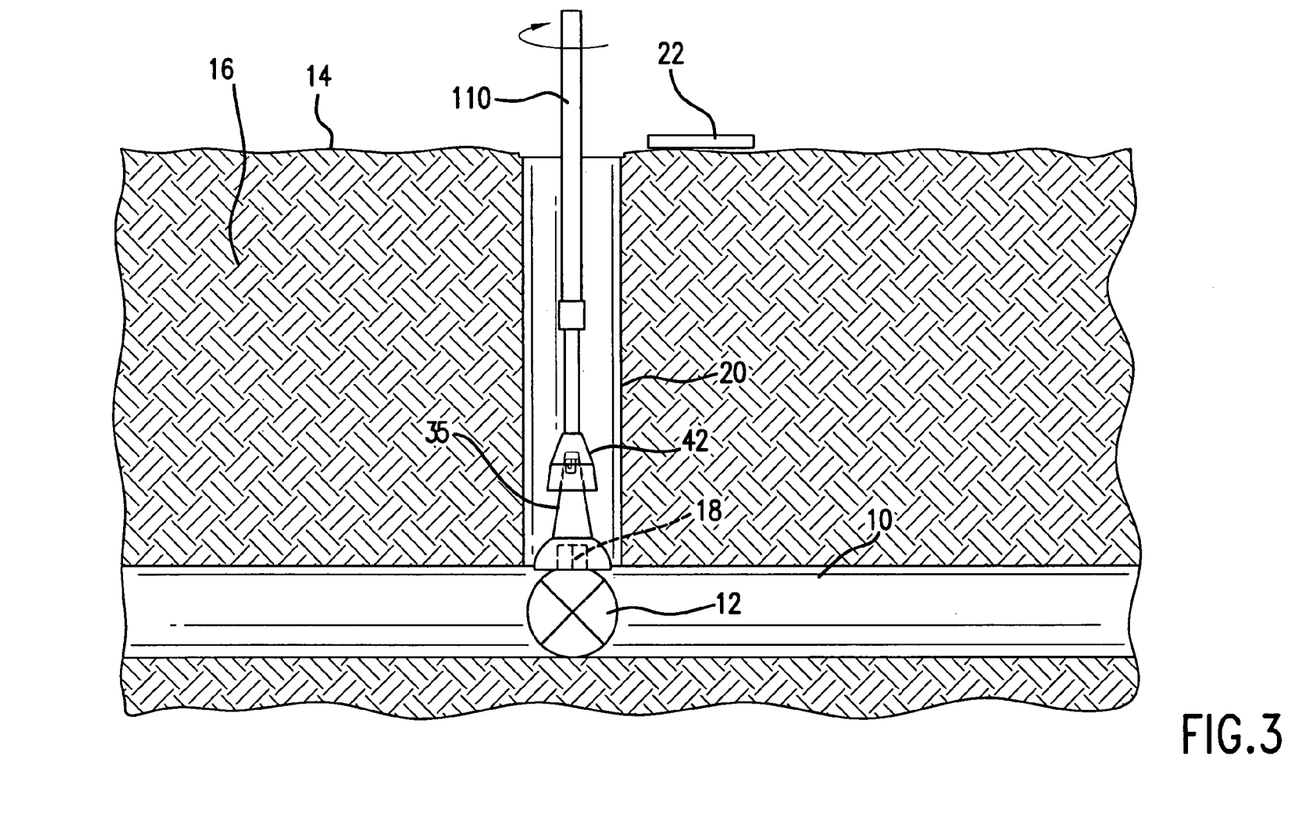
FIG. 3 is a view similar to FIGS. 1 and 2 showing the retrieving tool coupling to the shielding cap.
Figure 4:
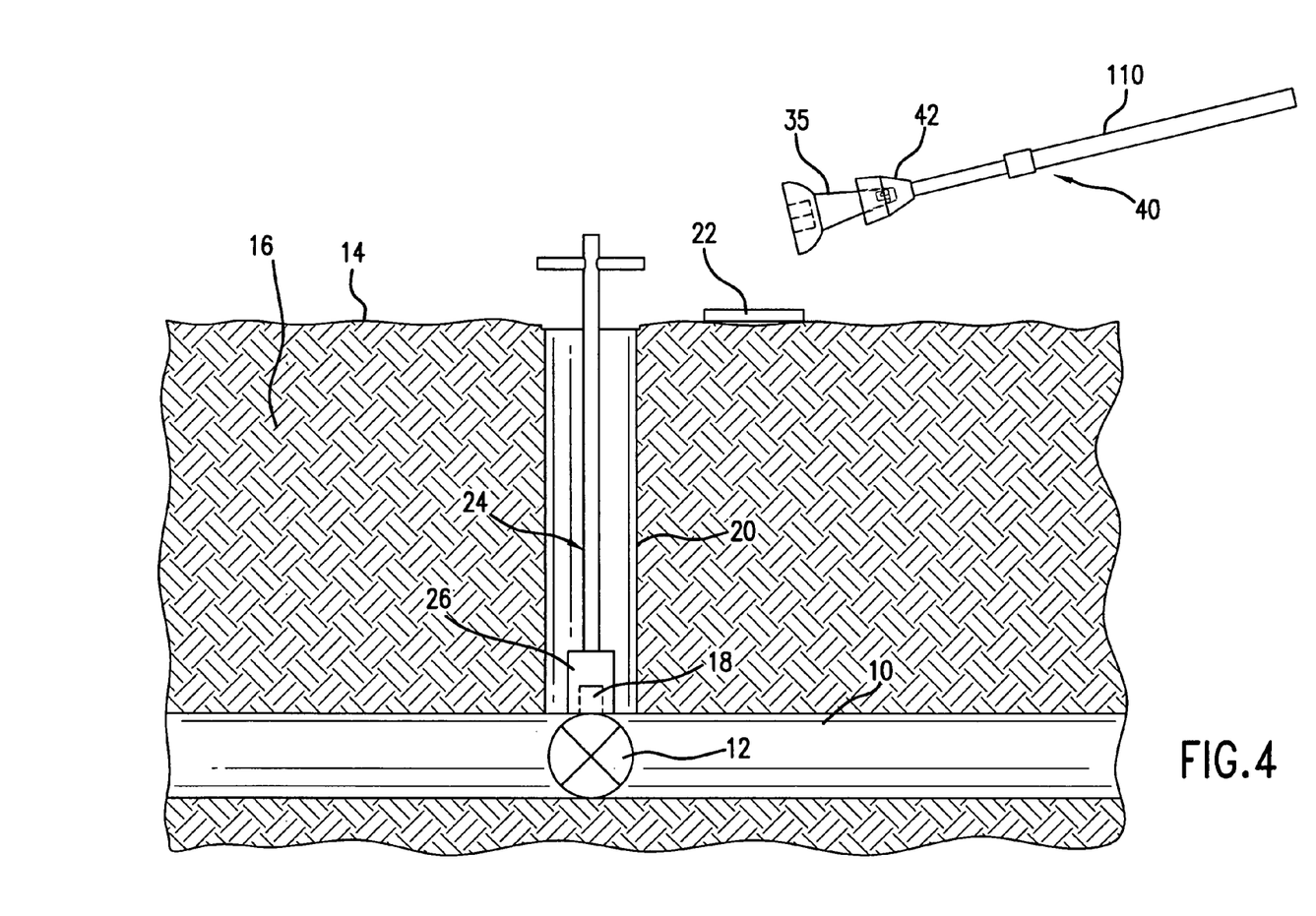
FIG. 4 is a view similar to FIGS. 1-3 showing the shielding cap removed from the valve and a wrench attached to an operating nut for the valve.

Referring now to FIG. 2, there is shown an arrangement for securing the in-ground valve 12 against unauthorized rotation utilizing an aluminum shielding cap 35 which encloses the operating nut 18 to minimize the chance of unauthorized opening or closing of the valve 12. In accordance with the present invention, the shielding cap 35 is removed from the operating nut 18 by a specialized retrieving tool 40 having a retrieving head 42 made of aluminum that receives and retains the shielding cap 35 so that the shielding cap 35 can be lifted from the valve box 20 as is shown in FIGS. 3 and 4. After the shielding cap 35 is lifted from the valve box 20 the wrench 24 is inserted into the valve box (FIG. 4) and engages the polygonal operating nut 18 with the polygonal socket 26 of the tool so that the valve 12 may be opened.

Figure 5:
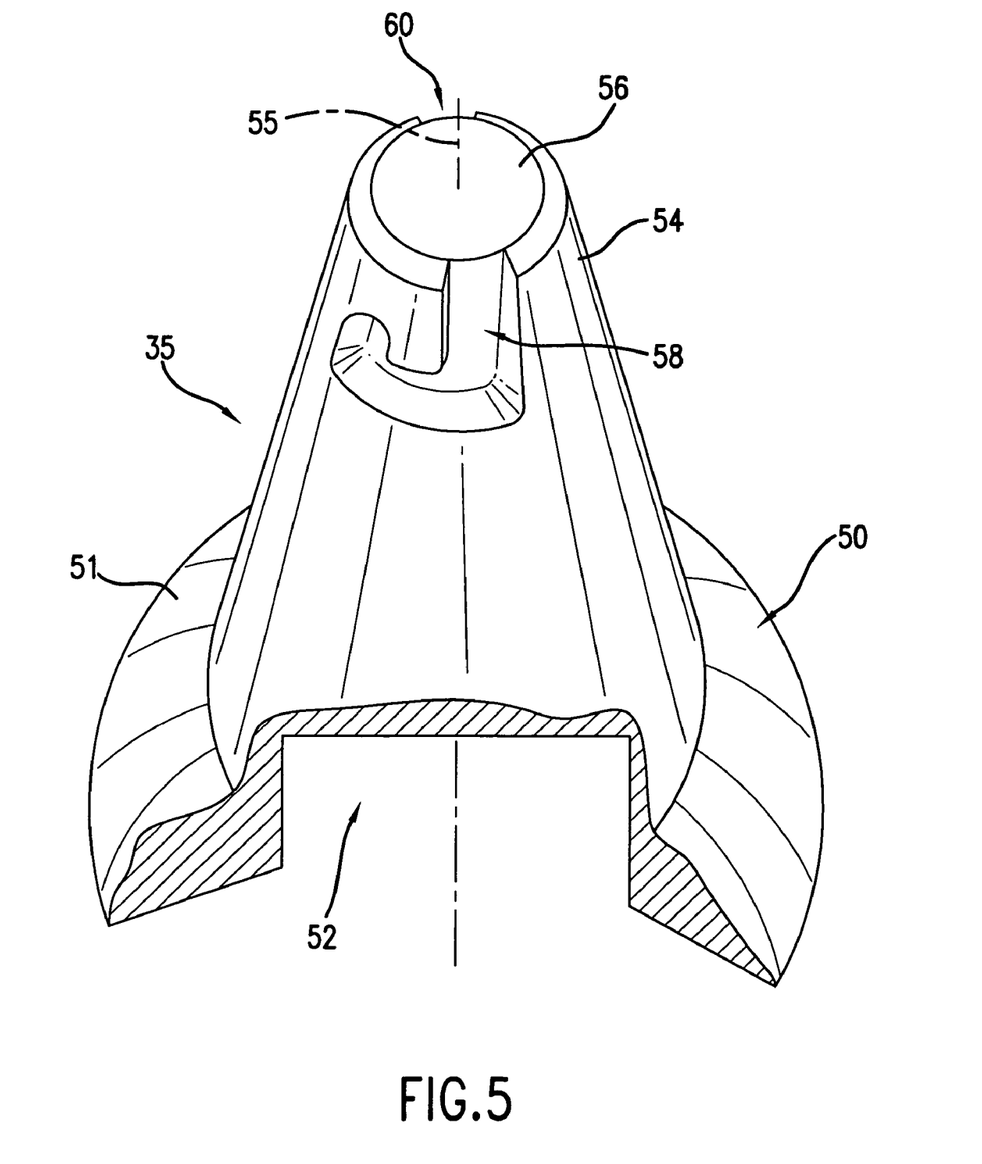
FIG. 5 is a perspective view of the shielding cap.

Referring now to FIG. 5 where the shielding cap 35 is shown in perspective, it is seen that the shielding cap 35 includes a base portion 50 which is domed shaped with a curved surface 51. The shielding cap 35 has a polygonal recess 52 therein which complements the polygonal shape of the valve operating nut 18. Typically, the valve operating nut 18 square and the recess 52 are square. Projecting from the domed arcuate surface 51 is a frustoconical projection 54 that extends in the direction of axis 55 of the shielding cap 35 and has a diameter less than the base 50. Proximate the top 56 of the frustoconical projection 54 there is at least one J-shaped slot 58 that provide a first coupler. In a preferred embodiment, there are two J-shaped slots 58 and 60 on opposite sides of the frustoconical projection 54 that provide the first coupler.

Figure 6:
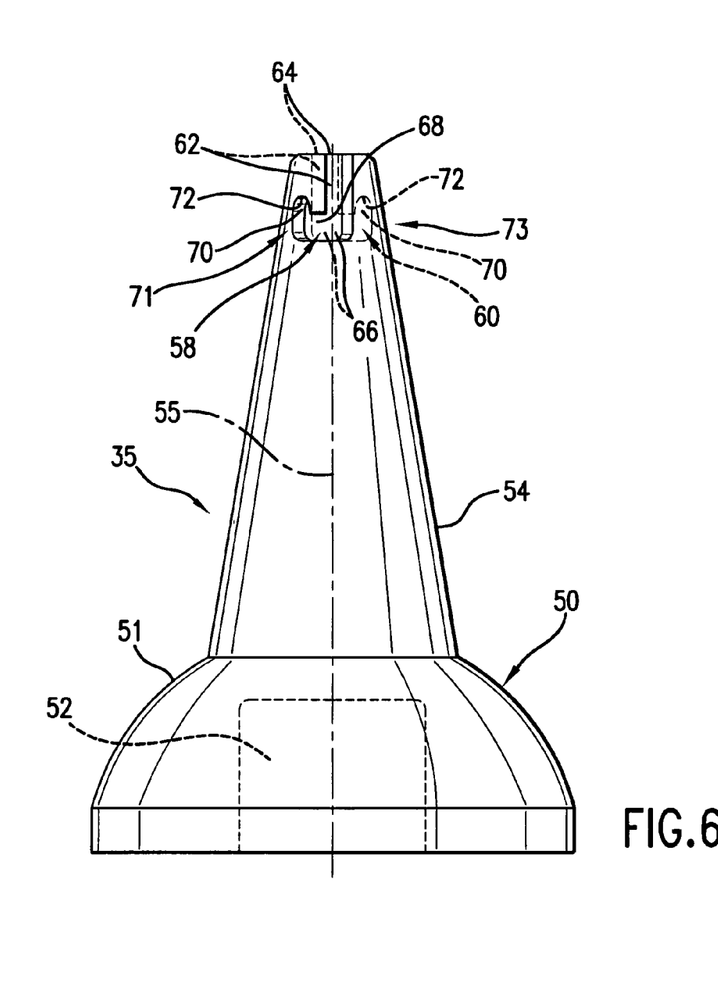
FIG. 6 is a side elevation of the shielding cap.
Figure 7:
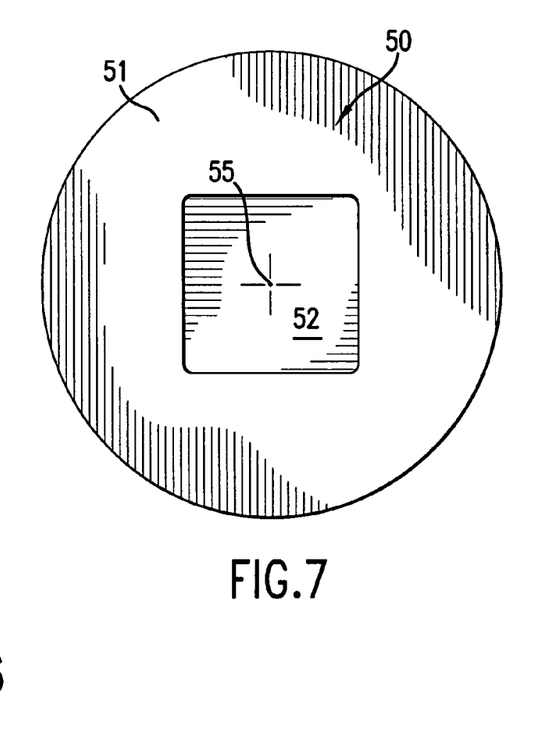
FIG. 7 is a bottom view of the shielding cap.
Figure 8:
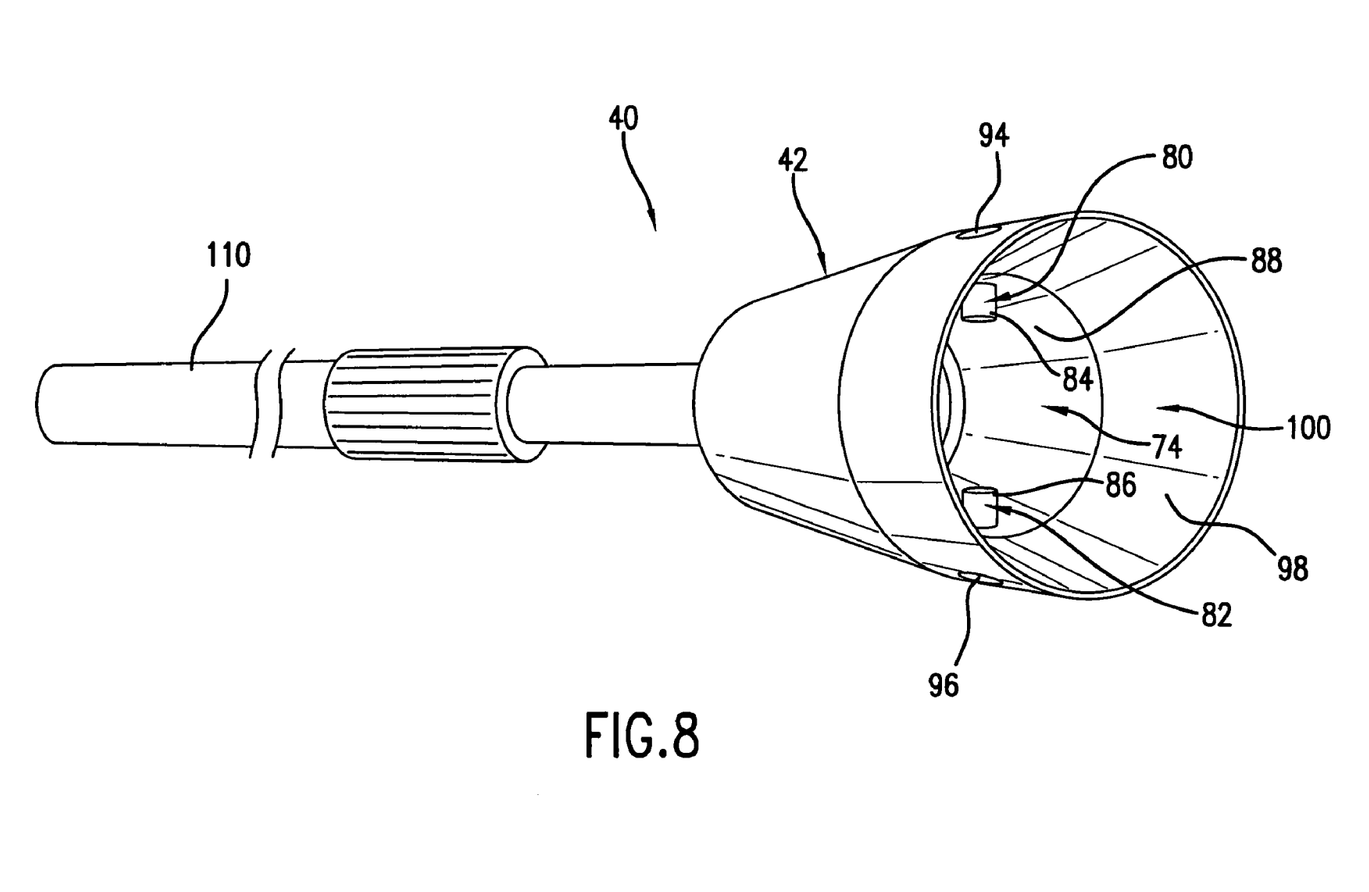
FIG. 8 is a perspective view of the retrieving tool.
Figure 9:
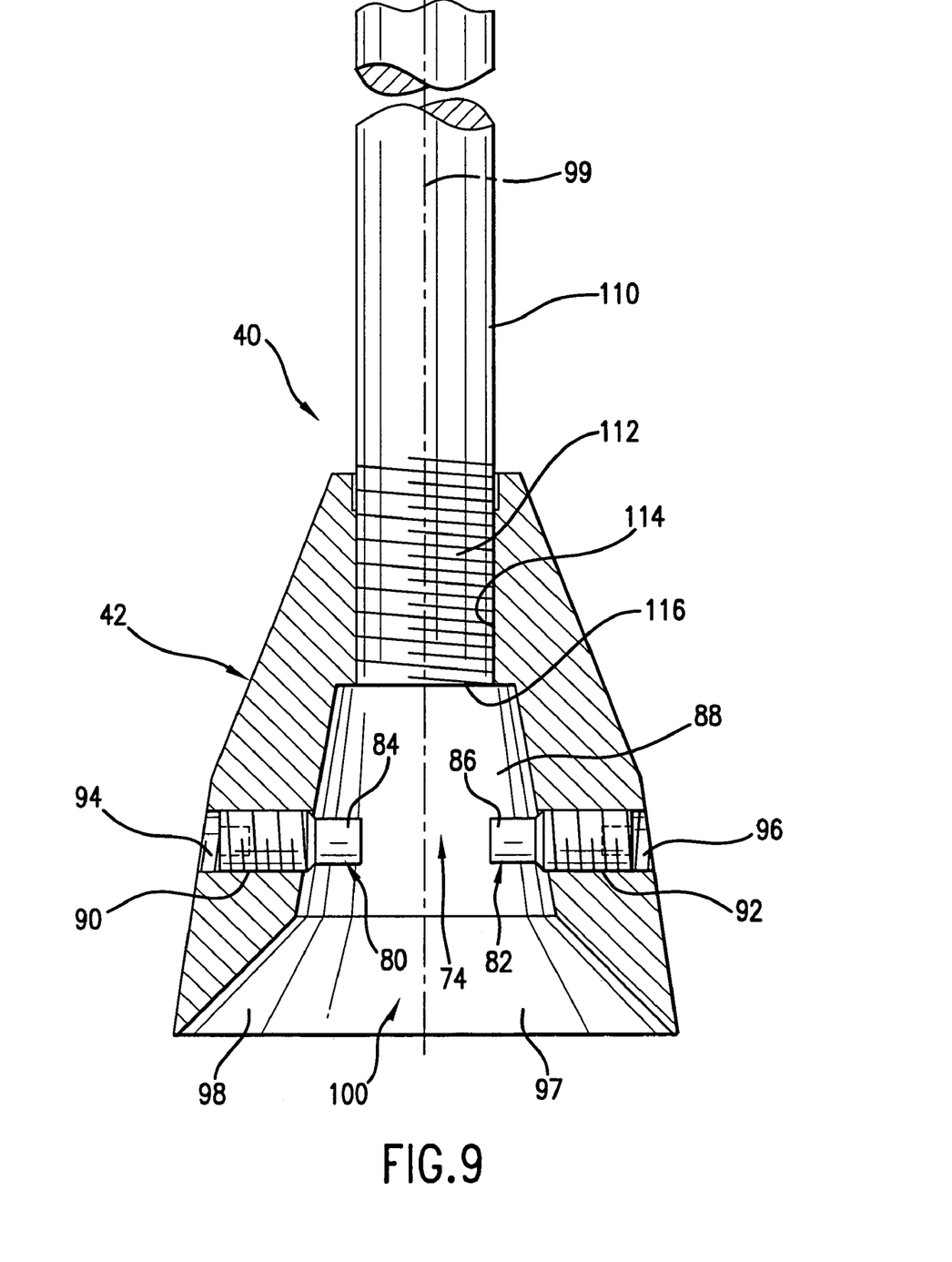
FIG. 9 is an elevation of a retrieving head used with the retrieving tool.

Referring now mainly to FIGS. 6 and 7, each of the J-shaped slots 58 and 60 have an axially extending shank portion 62 which extends in the direction of the axis 55 and which has an open top end 64 and terminates in a U-shaped section 66. The U-shaped section 66 has a leg coextensive with the shank portion 62; a bite portion 68, and a short, axially extending terminal leg 70 having a closed end 72. The J-shaped slots 58 and 60 form a first coupling 73 in the shielding member 35 that couples with a second coupling member 74 in the conical head 42 on the retrieving head 42 on the retrieving tool 40 (FIGS. 7-9). As is apparent, the base 50 has a diameter almost as great as the box 20. In one example, the base has a diameter of 5.75 inches with the box 20 having a diameter of 6-8 inches.

Referring now to mainly to FIGS. 8 and 9, the retrieving head 42 has a pair of opposed stainless steel pins 80 and 82, each having projecting portions 84 and 86 respectively that extend into a first frustoconical recess portion 88 of the retrieving head 42 to provide a second coupler. The pins 80 and 82 have threaded portions 90 and 92 that thread into threaded bores 94 and 96 through the retrieving head 42 to retain the pins 80 and 82 in place in the retrieving head. The retrieving head 42 has a second frustoconical recess portion 98 which has a shallower slope 98. For example, the slope of the second recess portion 98 is about 45° and the slope of the first recess portion 88 is about 10° with respect to the axis 99 of the retrieving head. The recesses 97 and 88 form a socket 100 for receiving the frustoconical projection 54 on the shielding member 35 so that the frustoconical projection nests within the socket.

The retrieving head 42 has a tubular rod 110 which provides an elongated handle for lowering the retrieving head into the box 20 to retrieve the shielding member 35. Preferably, the tubular rod 110 has an end 112 which threads into a threaded bore 114 of the retrieving head 42 with the handle 110 being long enough to terminate at the top 116 of the first recess 88.

In operation, the socket 100 of FIG. 9 is lowered onto the frustoconical projection 54 of the shielding cap 35. Using the tubular rod 110, the retrieving head 42 is rotated in a clockwise direction. When the pins 80 and 82 align with the openings 64 of the J-shaped slots 58 and 60, the pins then drop down the shank portions 62 to the bites 68 of the slots 58 and 60. As the retrieving head 42 continues to rotate about its axis, the pins 80 and 82 advance to align with the upwardly extending closed ends 72 of the J-shaped slots. When the tubular rod 110 is then pulled up, the pins 80 and 82 abut the closed ends 72 of the slots 58 and 60 so that the shielding cap 35 can be withdrawn from the valve operating nut 18 and through the valve box 20 as is shown in FIGS. 3 and 4. The operating nut 18 is then opened with the wrench 24 that engages the operating nut with the complementary socket 26.

After the valve 12 has been opened or closed using the wrench 24, the shielding cap 35 is lowered back through the valve box 20 so that the valve 18 is within the recess 52 in the shielding cap. The retrieving head 42 is then rotated in the counter-clockwise direction after the pins 80 and 82 are allowed to drop into the bite portions 68 of the J-shaped plates 58 and 60. The tubular rod 110 allow the pins 80 and 82 to move up the shank portions 62 of the J-shaped slots 58 and 60 so that the retrieving head 42 uncouples from the shielding cap 35. The retrieving head 42 is then completely withdrawn from the valve box 20 and the valve box cover 22 is reinstalled.

In the aforedescribed way, a security arrangement is provided for securing in-ground water valves such as the valves 12, which in the illustrated example are "critical" valves, but maybe any type of underground valve for which security from unauthorized operators is sought.

From the foregoing description, one skilled in the art can easily ascertain the essential characteristics of this invention, and without departing form the spirit and scope thereof, can make various changes and modifications of the invention to adapt it to various usages and conditions.

We claim:

1. An arrangement for securing an in-ground water valve having a polygonal operating nut rotatable by a wrench socket of a wrench having an elongated operating rod, comprising:

a shielding cap having a recess at a first end that fits over the polygonal operating nut in non-rotational relationship with respect thereto, the shielding cap having a conical portion projecting away from the recess toward a second end of the shielding cap;

a first coupler on the shielding cap;

a retrieving head having a first end and a second end, the first end having a handle extending therefrom and the second end having a retrieving socket for axially receiving the conical portion of the shielding cap in rotational relation therewith, and a second coupler complementing the first coupler positioned within the retrieving socket of the retrieving head, wherein upon moving the retrieving socket axially down and over the conical projection and rotating the retrieving head the first and second couplers are axially coupled and, the shielding cap is liftable to expose the operating nut of the valve for operation by the wrench socket.

2. The arrangement of claim 1 wherein the conical projection has a surface with the first coupler associated therewith and the retrieving socket has a conical surface with the second coupler associated therewith.

3. The arrangement of claim 2 wherein the first coupler comprises at least one groove in the coupler and wherein the second coupler comprises at least one projection in the retrieving socket.

4. The arrangement of claim 3 wherein the groove is J-shaped with the J having a shank portion extending downwardly from the top of the conical projection and having a U-shaped portion at the bottom of the shank portion, a first leg of the U-shaped portion being continuous with the shank and a second leg having a closed end, and wherein the projection within the retrieving socket enters the J-shaped groove through the shank portion of the groove, moves laterally in the bite portion of the groove and seats against the closed end of the second leg, whereby the retrieving head is moved upwardly, the retrieving head lifts the shielding cap from the operating nut.

5. The arrangement of claim 4 wherein there are at least two J-shaped grooves and two projections with each J-shaped groove receiving one of the projections.

6. The arrangement of claim 4 wherein there are two J-shaped grooves on opposite sides of the conical member and two opposed projections with each J-shaped groove receiving one of the projections.

7. The arrangement of claim 6 wherein the shielding cap is made of aluminum.

8. The arrangement of claim 7 wherein the retrieving head is made of aluminum.

9. The arrangement of claim 1 wherein the elongate rod is a telescoping tube having a length ranging from about 3 feet to about 9 feet.

10. The arrangement of claim 1 wherein the shielding cap is made of aluminum.

11. The arrangement of claim 1 wherein the first coupler is disposed on the conical projection proximate the second end of the shielding cap.

12. The arrangement of claim 11 wherein the first coupler comprises as least one J-shaped slot and the second coupler comprises at least one pin receivable in the slot for lifting the shielding cap from the operating nut.

13. An arrangement for securing an in-ground water valve having a polygonal operating nut operable by the wrench socket of a wrench having an elongate operate rod, comprising:

a shielding cap having a conical projection extending therefrom and a recess at a first end that fits over the polygonal operating nut in non-rotational relation with respect thereto, the conical projection having a first coupler thereon;

a retrieving head having a first end and a second end, the first end having an elongate operating rod extending therefrom and the second end having a second coupler configured as a retrieving socket with a concave conical surface complementing the conical projection of the first coupler when the retrieving socket and conical projection nest, wherein upon coupling the first and second couplers, the shielding cap is liftable to expose the operating nut of the valve for operation by the wrench socket.

14. The arrangement of claim 13 wherein the first coupler comprises at least one groove in the conical member and wherein the second coupler comprises at least one projection in the retrieving socket.

15. The arrangement of claim 14 wherein the groove is J-shaped with the J having a shank portion extending downwardly from the top of the conical projection and having a U-shaped portion at the bottom of the shank portion, a first leg of the U-shaped portion being continuous with the shank and a second leg having a closed end, and wherein the projection within the socket enters the J-shaped groove through the shank portion of the groove, moves laterally in the bite portion of the groove and seats against the closed end of the second leg, whereby when the retrieving head is moved upwardly, the retrieving head lifts the shielding cap from the operating nut.

16. The arrangement of claim 15 wherein there are at least two J-shaped grooves.

17. The arrangement of claim 15 wherein there are two J-shaped grooves on opposite sides of the conical member.

18. The arrangement of claim 17 wherein the shielding cap is made of aluminum.

19. The arrangement of claim 18 wherein the retrieving head is made of aluminum.

* * * * *

UNITED STATES PATENT AND TRADEMARK OFFICE
CERTIFICATE OF CORRECTION

PATENT NO. : 7,322,563 B2
APPLICATION NO. : 11/101650
DATED : January 29, 2008
INVENTOR(S) : Fred J. Stehling It is certified that error appears in the above-identified patent and that said Letters Patent is hereby corrected as shown below:

Column 5, line 17 reads "coupled and, the" should read -- coupled, and the --
Column 5, line 51 reads "elongate" should read -- elongated --
Column 6, line 6 reads "comprises as least" should read -- comprise at least --
Column 6, line 11 reads "elongate operate" should read -- elongated operating --
Column 6, line 20 reads "elongate" should read -- elongated --

Signed and Sealed this

Second Day of September, 2008

JON W. DUDAS
*Director of the United States Patent and Trademark Office*